United States Patent
Lofthouse et al.

(10) Patent No.: US 9,860,392 B2
(45) Date of Patent: Jan. 2, 2018

(54) DIRECT-CURRENT TO ALTERNATING-CURRENT POWER CONVERSION

(71) Applicant: Silicon Laboratories Inc., Austin, TX (US)

(72) Inventors: Sean Anthony Lofthouse, Pflugerville, TX (US); Bassem ElAzzami, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 130 days.

(21) Appl. No.: 14/731,755

(22) Filed: Jun. 5, 2015

(65) Prior Publication Data
US 2016/0360044 A1    Dec. 8, 2016

(51) Int. Cl.
*H02M 1/00*    (2006.01)
*H04M 19/02*    (2006.01)
*H04M 19/00*    (2006.01)

(52) U.S. Cl.
CPC ......... *H04M 19/02* (2013.01); *H04M 19/001* (2013.01); *H02M 1/00* (2013.01)

(58) Field of Classification Search
CPC ............ H02M 1/10; H02M 7/66; H02M 7/68; H02M 7/757; H02M 7/758; H02M 2007/00; H04M 19/001; H04M 19/02
See application file for complete search history.

(56) References Cited

U.S. PATENT DOCUMENTS

| | | |
|---|---|---|
| 3,965,306 A | 6/1976 | Watkins |
| 4,161,321 A | 7/1979 | Hendrixon et al. |
| 4,165,001 A | 8/1979 | Cooper |
| 4,169,217 A | 9/1979 | Szanto et al. |
| 4,247,972 A | 2/1981 | Hendrixon et al. |
| 4,281,219 A | 7/1981 | Cowpland et al. |
| 4,371,755 A | 2/1983 | Brolin |
| 4,468,541 A | 8/1984 | Cohen |
| 4,539,438 A | 9/1985 | Rosenbaum et al. |
| 4,573,866 A | 3/1986 | Sandy et al. |
| 4,587,818 A | 5/1986 | Griffin |
| 4,607,141 A | 8/1986 | Schorr |
| 4,633,894 A | 1/1987 | Okuda |
| 4,741,024 A | 4/1988 | Del Monte et al. |
| 4,764,956 A | 8/1988 | Rosch et al. |
| 4,776,007 A | 10/1988 | Styrna et al. |
| 4,803,721 A | 2/1989 | Schingh |
| 4,829,567 A | 5/1989 | Moisin |
| 4,860,332 A | 8/1989 | Chism |
| 4,864,609 A | 9/1989 | Moisin |

(Continued)

*Primary Examiner* — Matthew Nguyen
(74) *Attorney, Agent, or Firm* — Cesari & Reed LLP; R. Michael Reed (57) ABSTRACT

In some embodiments, a power converter circuit includes a first power converter coupled between a direct-current (DC) node and a first pair of output nodes. The first power converter may be configured to provide a first power signal having a first phase to the first pair of output nodes. The power converter circuit may also include a second power converter coupled between the DC node and a second pair of output nodes. The second power converter may be configured to provide a second power signal having a second phase to the second pair of output nodes. The second phase and the first phase may differ by an odd multiple of ninety degrees.

16 Claims, 5 Drawing Sheets

(56) References Cited

U.S. PATENT DOCUMENTS

| | | | |
|---|---|---|---|
| 4,897,749 A | 1/1990 | Perlov et al. | |
| 4,940,937 A | 7/1990 | Hattori | |
| 4,988,281 A | 1/1991 | Heathe et al. | |
| 5,014,305 A | 5/1991 | Moisin | |
| 5,052,039 A | 9/1991 | Moisin | |
| 5,148,475 A | 9/1992 | Warwick et al. | |
| 5,203,673 A | 4/1993 | Evans | |
| 5,260,506 A | 11/1993 | Cappella | |
| 5,400,685 A | 3/1995 | Cappella | |
| 5,421,518 A | 6/1995 | Robisch et al. | |
| 5,515,417 A | 5/1996 | Cotreau | |
| 5,872,842 A | 2/1999 | Daly et al. | |
| 6,129,248 A | 10/2000 | Hagele | |
| 6,166,898 A | 12/2000 | Lee et al. | |
| 6,251,024 B1 | 6/2001 | Summers et al. | |
| 6,567,521 B1 | 5/2003 | Hein | |
| 6,873,702 B1 | 3/2005 | Rossi et al. | |
| 6,916,226 B2 | 7/2005 | Moloney et al. | |
| 6,925,178 B2 | 8/2005 | Gammel et al. | |
| 6,931,108 B2 | 8/2005 | Ludeman | |
| 6,940,970 B2 | 9/2005 | Wittman | |
| 6,994,710 B2 | 2/2006 | White et al. | |
| 7,021,852 B1 | 4/2006 | Turner et al. | |
| 7,050,577 B2 | 5/2006 | Enriquez et al. | |
| 7,181,003 B2 | 2/2007 | George | |
| 7,181,004 B2 | 2/2007 | George | |
| 7,181,186 B2 * | 2/2007 | Oh | H03D 3/009 375/269 |
| 7,195,453 B2 | 3/2007 | Martin et al. | |
| 7,246,936 B2 | 7/2007 | Gates et al. | |
| 7,257,222 B2 | 8/2007 | Zojer et al. | |
| 7,260,214 B2 | 8/2007 | Enriquez et al. | |
| 7,393,182 B2 | 7/2008 | Matheny | |
| 8,162,934 B2 | 4/2012 | Potter | |
| 8,208,384 B2 | 6/2012 | Mckelvey et al. | |
| 8,320,995 B2 | 11/2012 | Schwamb, Jr. | |
| 8,366,119 B2 | 2/2013 | Rimet | |
| 8,419,306 B1 | 4/2013 | Levine | |
| 2007/0086889 A1 | 4/2007 | Matheny | |
| 2007/0205564 A1 | 9/2007 | Suzuki et al. | |
| 2008/0095671 A1 | 4/2008 | Mathus et al. | |
| 2008/0238000 A1 | 10/2008 | Rimet | |
| 2008/0286157 A1 | 11/2008 | Mathus et al. | |
| 2009/0002149 A1 | 1/2009 | McKelvey et al. | |
| 2009/0035050 A1 | 2/2009 | Ramos | |
| 2009/0163917 A1 | 6/2009 | Potter | |
| 2009/0231768 A1 | 9/2009 | Speyer | |
| 2010/0031671 A1 | 2/2010 | Chehab et al. | |
| 2010/0034706 A1 | 2/2010 | Mathus et al. | |
| 2011/0229597 A1 | 9/2011 | Brelski et al. | |
| 2012/0034101 A1 | 2/2012 | James et al. | |
| 2012/0262953 A1 * | 10/2012 | Jungreis | H02M 3/285 363/17 |
| 2012/0263822 A1 | 10/2012 | Halter et al. | |
| 2012/0320637 A1 * | 12/2012 | Kyono | H02M 3/337 363/21.02 |
| 2013/0026749 A1 | 1/2013 | Obrien et al. | |
| 2013/0122774 A1 | 5/2013 | Rezeq | |
| 2013/0344455 A1 | 12/2013 | Hull et al. | |
| 2014/0056781 A1 | 2/2014 | Jaaskelainen et al. | |
| 2014/0360801 A1 | 12/2014 | Obrien et al. | |
| 2014/0369098 A1 * | 12/2014 | Li | H02S 40/32 363/95 |
| 2015/0053793 A1 | 2/2015 | Bellino et al. | |
| 2015/0078900 A1 | 3/2015 | Allen | |

* cited by examiner

DIRECT-CURRENT TO ALTERNATING-CURRENT POWER CONVERSION

FIELD

The present disclosure is generally related to direct-current to alternating-current power conversion, and more particularly to circuitry configured to produce balanced AC signals from a DC voltage.

BACKGROUND

Subscriber line interface circuits may be found in a central office exchange of a telecommunications network. A subscriber line interface circuit (SLIC) provides a communications interface between a digital switching network of the central office and an analog subscriber line. The subscriber line may include a tip line and a ring line. The analog subscriber line connects the SLIC to subscriber equipment, such as a telephone.

The SLIC may communicate data signals, control signals, or both to the subscriber equipment. A ringing signal is an example of a subscriber equipment control signal that uses a relatively high voltage and current as compared to a voice band data signals. In some examples, the SLIC may provide a sinusoidal or trapezoidal ringing signal to the subscriber equipment.

SUMMARY

In some embodiments, a power converter circuit may include a first power converter coupled between a direct-current (DC) node and a first pair of output nodes. The first power converter may be configured to provide a first power signal having a first phase to the first pair of output nodes. The power converter circuit may also include a second power converter coupled between the DC node and a second pair of output nodes. The second power converter may be configured to provide a second power signal having a second phase to the second pair of output nodes. The second phase and the first phase may differ by an odd multiple of ninety degrees. In some embodiments, the first and second power signals may be periodic waveforms. In some embodiments, the first and second power signals may be balanced waveforms or unbalanced waveforms. In some embodiments, the first and second power signals may be sinusoidal waveforms or trapezoidal waveforms.

In other embodiments, a circuit may include a first driver circuit having an input coupled to a node to receive a DC signal, a first output coupled to a first output node and a second output coupled to a second output node. The circuit may also include a second driver circuit having an input coupled to the node to receive the DC signal, a first output coupled to a third output node and a second output coupled to a fourth output node. The circuit may further include a control circuit configured to control the first driver circuit to provide a first differential sinusoidal signal pair having a first phase to the first and second output nodes and to control the second driver circuit to provide a second differential sinusoidal signal pair having a second phase to the third and fourth output node. The second phase and the first phase may differ by an odd multiple of ninety degrees.

In some other embodiments, a method may include controlling a first driver circuit to convert a direct-current (DC) input signal into a first sinusoidal signal pair having a first phase. The method may further include controlling a second driver circuit to convert the DC input signal into a second sinusoidal signal pair having a second phase that differs from the first phase by an odd multiple of ninety degrees. The method may also include providing the first sinusoidal signal pair to a first pair of outputs and the second sinusoidal signal pair to a second pair of outputs.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of circuits, systems, and methods are described below that may be used to provide DC-to-AC and AC-to-DC power conversion. In some embodiments, given two sinusoidal loads, the circuits, systems, and methods may be used to provide DC-to-AC power conversion such that the peak power becomes equal to the average power. In some embodiments, a first signal generator may be used to generate a first power signal and to provide the power signal to a first AC load. The first signal generator may produce a power signal that is approximately equal to $A\sin^2(wt)$, where A is a scalar, w is a frequency component, and t represents time. In some embodiments, a second signal generator may be used to generate a second power signal and to provide the second power signal to a second AC load. The second power signal may be approximately 90 degrees out of phase (or an odd multiple of ninety degrees out of phase) with respect to the first power signal such that the second power signal may be approximately equal to $A\cos^2(wt)$. The sum of the two signals is one, which allows the circuits, systems and methods to produce two AC signals to power two AC loads from a single DC signal at a node. One possible example of a circuit configured to provide DC-to-AC power conversion is described below with respect to FIG. 1.

Figure 1:
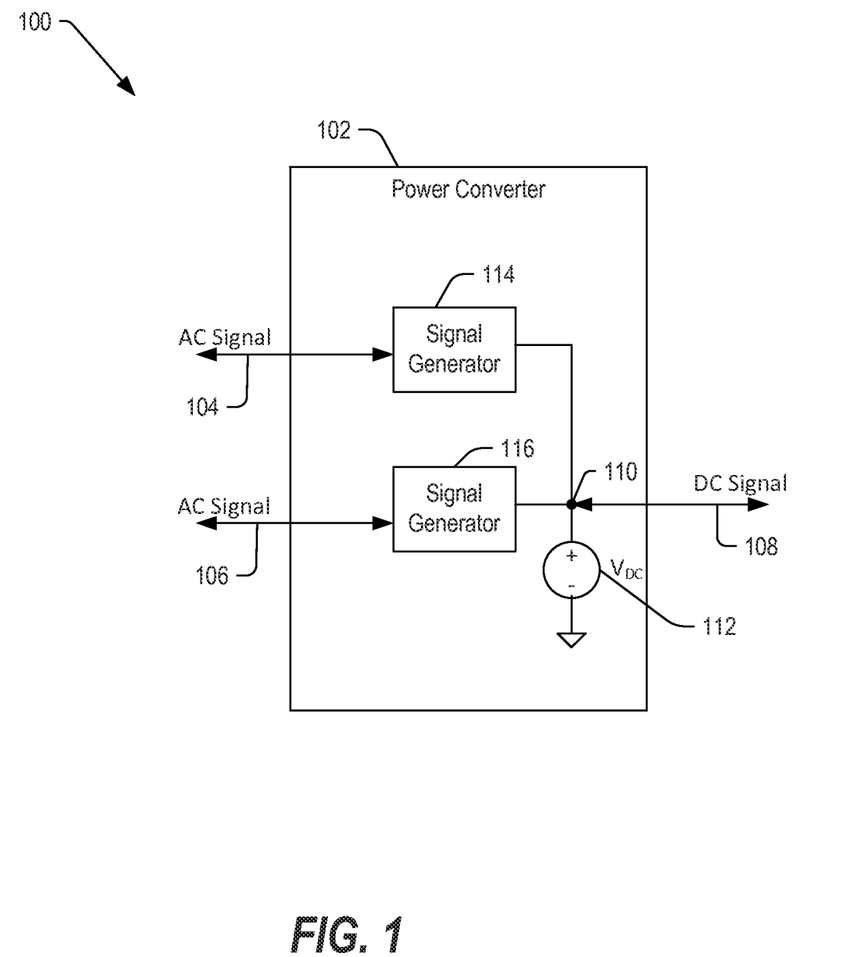
FIG. 1 is a block diagram of a system including a power converter circuit configured to provide direct-current (DC) to alternating-current (AC) power conversion, and vice versa, in accordance with some embodiments of the present disclosure.

FIG. 1 is a block diagram of a system 100 including a power converter circuit 102 configured to provide direct-current (DC) to alternating-current (AC) power conversion, and vice versa, in accordance with some embodiments of the present disclosure. The power converter circuit 102 may include a first signal generator 114 coupled between a first node 104 and a second node 110, a second signal generator 116 coupled between a third node 106 and the second node 110, and a supply voltage source 112 coupled between the second node 110 and ground. The second node 110 may be coupled to a node 108. In some embodiments, the first node 104 may carry one or more first AC signals (first sinusoidal signals), the second node 106 may carry one or more second AC signals (second sinusoidal signals) that may be 90 degrees ($\pi$ radians) out of phase with the one or more first AC signals, and the node 108 may carry a DC signal, such as a DC voltage from a voltage regulator, a battery source, another DC source, or any combination thereof.

In some embodiments, the signal generator 114 may be configured to receive a DC voltage from the node 110 and to produce a first balanced sinusoidal signal pair from the DC voltage. The sinusoidal signals of the balanced sinusoidal signal pair may be 180 degrees out of phase with each other and of equal amplitude. As such, the differential voltage of the sinusoidal signal pair mimics a squared sinusoidal signal, such as $\sin^2(wt)$, because the differential signal varies from zero volts to a peak voltage. Thus, the signal generator 114 may produce a first sinusoidal signal ($\sin^2(wt)$) in response to the DC voltage. The signal generator 116 may be configured to receive the DC voltage from the node 110 and to produce a second sinusoidal signal ($\cos^2(wt)$) in response thereto. The sum of the output signals ($\sin^2(wt)+\cos^2(wt)=1$), such that the DC voltage at the node 110 may be a stable DC source from which two balanced sinusoidal signals may be produced.

In an example, given two sinusoidal power loads, each load may have a peak power (P). The signal generator 114, for example, may generate a sinusoidal signal according to the following equation:

$$\frac{A\sin(wt)A\sin(wt)}{R} = \frac{A^2}{R}\sin^2(wt) \quad (1)$$

where A is an amplitude scalar, R is a resistance, w is a frequency component, and t represents time. The signal generator 116 can be controlled to be 90 degrees out of phase with respect to the output of the signal generator 114. For example, the signal generator 116 may generate a sinusoidal signal according to the following equation:

$$\frac{A\cos(wt)A\cos(wt)}{R} = \frac{A^2}{R}\cos^2(wt) \quad (2)$$

Since the two signal generators 114 and 116 share a common input node 110, the input power can be determined according to the following equation:

$$\frac{A^2}{R}\sin^2(wt) + \frac{A^2}{R}\cos^2(wt) = \frac{A^2}{R} \quad (3)$$

In equation 3, the term $$\frac{A^2}{R}$$

is a DC power term, which may represent the amplitude of the DC voltage divided by the resistance (i.e., the DC current).

While the above-example is describe in the context of conversion from a DC signal into two AC (sinusoidal) signals that are out of phase by 90 degrees, in some embodiments, the system 100 may be used to convert two AC (sinusoidal) signals into a single DC signal at the node 110. In an example, the signal generator 114 may convert signals at the node 104 into a first DC signal component and the signal generator 116 may convert signals at the node 106 into a second DC signal component. The first and second DC signal components may be summed at the node 110 to produce the DC output signal on the node 108.

While conventional AC-DC conversion techniques allow the peak powers to add linearly, such summing forces input power design to be twice the peak power, or four times larger than the average power, the system 100 allows the average power for two conversions to be two times the average power of a single channel. In other words, the two AC signals have the same input requirement as a peak power requirement of a single channel. In some embodiments, the power conversion technique of the system 100 may be used in the context of a two-channel subscriber line integrated circuit (SLIC) ringing two channels simultaneously, as described below with respect to the example embodiment of FIG. 2.

Figure 2:
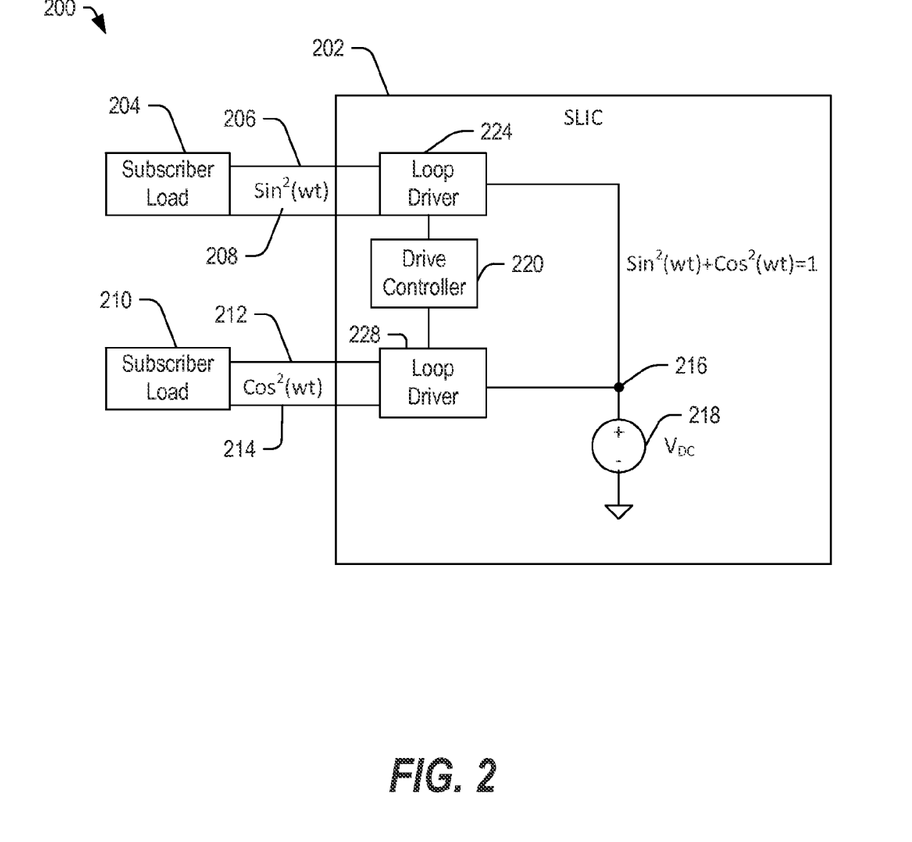
FIG. 2 is a block diagram of a system including subscriber line integrated circuit (SLIC) configured to provide DC to AC power conversion, and vice versa, in accordance with some embodiments of the present disclosure.

FIG. 2 is a block diagram of a system 200 including a subscriber line integrated circuit (SLIC) 202 configured to provide DC to AC power conversion, and vice versa, in accordance with some embodiments of the present disclosure. The SLIC 202 may be coupled to a first subscriber load 204 via a tip line 206 and a ring line 208 forming a first channel. The SLIC 202 may also be coupled to a second subscriber load 210 via a tip line 212 and a ring line 214.

The SLIC 202 may include a loop driver 224 coupled to the first subscriber load 204 via the tip line 206 and the ring line 208. The SLIC 202 may further include a loop driver 228 coupled to the second subscriber load 210 via the tip line 212 and the ring line 214. The SLIC 202 may also include a drive controller 220 coupled to the loop driver 224 and the loop driver 228 and configured to control the phase and timing of the signals produced by the loop drivers 224 and 228. The SLIC 202 may also include or be coupled to a DC supply source 218, such as a voltage regulator, a battery, another circuit, or any combination thereof, which may be configured to supply a DC voltage to the loop drivers 224 and 228. The DC supply source 218 may be coupled to a node 216, which may be coupled to the loop drivers 224 and 228.

In some embodiments, the driver controller 220 may control the loop drivers 224 and 228 to produce balanced (or unbalanced) sinusoidal signals to the tip line 206 and the ring line 208, and at the same time, to provide balanced (or unbalanced) sinusoidal signals to the tip line 212 and the ring line 214. By providing a first sinusoidal signal and a second sinusoidal signal which are out of phase by an odd multiple of 90 degrees (n$\pi$ radians, where n is an odd integer), the input power is simplified to the DC component.

Figure 3:
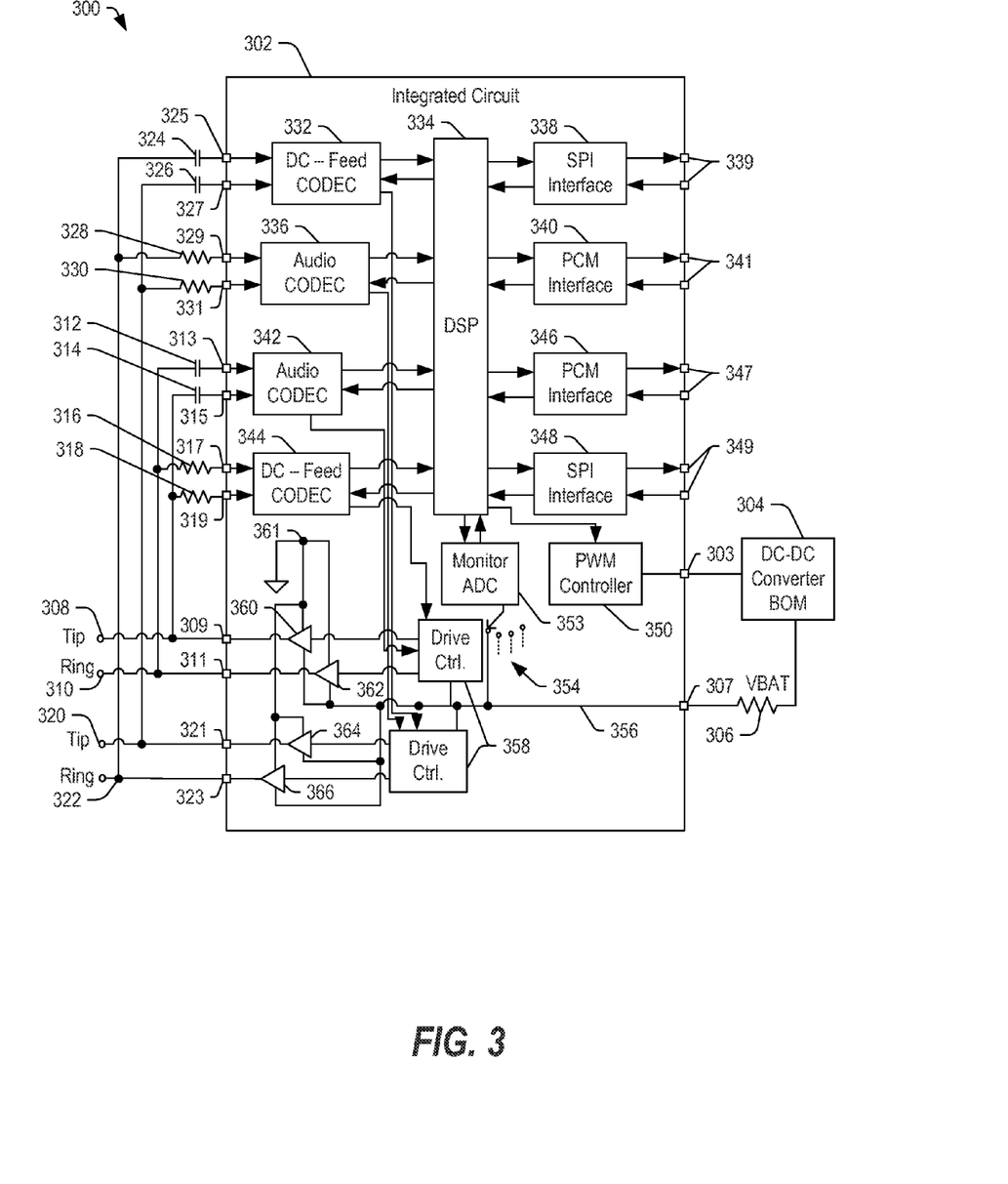
FIG. 3 is a block diagram of a system including a circuit configured to provide DC to AC power conversion, and vice versa, in accordance with some embodiments of the present disclosure.

FIG. 3 is a block diagram of a system 300 including a circuit 302 configured to provide DC to AC power conversion, and vice versa, in accordance with some embodiments of the present disclosure. The integrated circuit 302 may be coupled via a node 303 (which may be implemented as a pin or pad) to a DC-DC converter (bill of materials) BOM 304. The DC-DC converter BOM 304 may include or be coupled to a power source, such as a battery, and may be configured to provide a voltage (VBAT) to a resistor 306 coupled between the DC-DC converter BOM 304 and a node 307. In some embodiments, the DC-DC converter BOM 304 may include a solar panel array, a battery circuit, or another source of DC power.

The integrated circuit 302 may also be coupled to a tip line 308 via a node 309 and to a ring line 310 via a node 311. The tip line 308 and the ring line 310 may be coupled to a customer premises equipment (CPE) device, such as a phone. The tip line 308 and the ring line 310 may cooperate to form a part of a first channel, which may include other components. Further, the integrated circuit 302 may be coupled to a tip line 320 via a node 321 and to a ring line 322 via a node 323. The system 300 may also include a high pass filter (such as a capacitor 312) coupled between the tip line 308 and a node 313 and may include a capacitor 314 coupled between the ring line 310 and a node 325. Further, the system 300 may include a resistor 316 coupled between the ring line 310 and a node 317 and a resistor 318 coupled between the tip line 308 and a node 319. The system 300 may also include a capacitor 324 coupled between the ring line 322 and a node 325, a capacitor 326 coupled between the tip line 320 and a node 327, a resistor 328 coupled between the ring line 322 and a node 329, and a resistor 330 coupled between the tip line 320 and a node 331.

The integrated circuit 302 may include a DC Feed coder/decoder (CODEC) 332 including a first input coupled to the node 325, a second input coupled to the node 327, and a connection to a digital signal processor (DSP) 334. In some embodiments, the DC Feed CODEC 332 may include a bi-directional input/output (I/O) coupling to the DC Feed CODEC 332. In some embodiments, the DC Feed CODEC 332 may include an output coupled to an input of the DSP 334 and an input coupled to an output of the DSP 334. The integrated circuit 302 may further include an audio CODEC 336 including a first input coupled to the node 329, a second input coupled to the node 331, and a connection to the DSP 334, which may include an input and an output or which may include a bi-directional I/O coupling. The integrated circuit 302 may further include an audio CODEC 342 including a first input coupled to the node 313, a second input coupled to the node 315, and a connection to the DSP 334, which may include an input and an output or which may include a bi-directional I/O coupling. The integrated circuit 302 may also include a DC Feed CODEC 344 including a first input coupled to the node 317, a second input coupled to the node 319, and a connection to the DSP 334, which may include an input and an output or which may include a bi-directional I/O coupling.

In some embodiments, the integrated circuit 302 may include a serial peripheral interface (SPI) 338 coupled to the DSP 334 and to nodes 339. The integrated circuit 302 may also include a pulse code metering (PCM) interface 340 coupled to the DSP 334 and to nodes 341. The integrated circuit 302 may further include a PCM interface 346 coupled to the DSP 334 and to nodes 347. The integrated circuit 302 may also include an SPI interface 348 coupled between the DSP 334 and nodes 349. In some embodiments, the SPI 338 and the PCM interface 340 may cooperate with the tip line 308 and the ring line 310 to provide the channel. Similarly, in some embodiments, the SPI 348 and the PCM interface 346 may cooperate with the tip line 320 and the ring line 322 to provide the channel.

In some embodiments, the integrated circuit 302 may include a pulse width modulator controller 350 coupled between the DSP 334 and the node 305 to provide control signals configured to control the widths and timing of pulses associated with the DC-DC converter BOM 304. The integrated circuit 302 may also include an analog-to-digital converter (ADC) monitor 353 coupled to the DSP 334 and selectively coupled to the node 356 via a switch 354. In some embodiments, the switch 354 may allow the ADC monitor 353 to be reused for measuring signals at multiple nodes (not shown).

In some embodiments, the integrated circuit 302 may include drive control circuitry 358, which may be coupled to the DC Feed CODECs 332 and 344 and to the audio CODECs 336 and 342. Further, the drive control circuits 358 may be coupled to signal generators (drive circuits 360, 362, 634, and 366). Drive circuit 360 may include an input coupled to one of the drive control circuits 358, a supply input coupled to the node 356, a second supply input coupled to the node 361 (which is coupled to ground), and an output coupled to the node 309. The drive circuit 362 may include an input coupled to one of the drive control circuits 358, a supply input coupled to the node 356, a second supply input coupled to the node 361, and an output coupled to the node 311. The drive circuit 364 may include an input coupled to one of the drive control circuits 358, a supply input coupled to the node 356, a second supply input coupled to the node 361, and an output coupled to the node 321. The drive circuit 366 may include an input coupled to one of the drive control circuits 358, a supply input coupled to the node 356, a second supply input coupled to the node 361, and an output coupled to the node 323.

In some embodiments, the integrated circuit 302 may include a low-voltage integrated circuit CMOS device and a high-voltage integrated circuit (HVIC). The HVIC may be used to drive the tip lines 309 and 321 and the ring lines 311 and 323 with the required high-voltage DC levels, ringing signal and audio. In some embodiments, resistors 328, 330, 316, and 318 are fully differential sense resistors configured to provide feedback to the integrated circuit 302, which feedback may be used to control the TIP and RING signals and the loop current supplied to the loop in an off-hook state. Similarly, a fully differential AC sensing path may be provided by capacitors 324, 326, 312, and 314 to provide feedback for the AC impedance closed-loop system and may also be part of the transmit audio path.

In some embodiments, the DSP 334 provides DC feed control, provides control signals for system operations, and performs various diagnostic functions. Additionally, the DSP 334 may process signals to provide audio transmit and receive functions. Additionally, the DSP 334 may determine AC impedances and may perform AC impedance synthesis. Further, the DSP 334 may control various operations to facilitate hybrid communications, such as 2-wire, 4-wire, etc.

In some embodiments, audio data may be transferred via a time-division multiplexed (TDM) PCM interface, such as the PCM interface 340 or the PCM interface 346, depending on the channel. In some embodiments, the PCM interface 346 and the SPI interface 348 may be omitted, and channel communications via the PCM interface 340 may be time-division multiplexed to provide multi-channel communications. The integrated circuit 302 may be controlled and monitored via control and status registers and coefficient random access memory (RAM), which may be accessible via the SPI interface 338 or the SPI interface 348

In some embodiments, the ADC monitor 353 may service the transmit and receive channels and may monitor line voltages and current as well as the battery voltage (VBAT). Further, in some embodiments, the PWM controller 350 may control the external DC-DC converter BOM 304 components to generate a negative battery voltage (VBAT). The battery voltage generation circuit intelligently tracks the VBAT voltage to a selected value under each operating state (e.g., on-hook, off-hook, ringing, etc.) to minimize the voltage drop on the HVIC circuitry, significantly reducing power consumption and dissipation. Additionally, in the ringing state, the VBAT voltage closely tracks the most negative crest of the TIP and RING ringing waveforms (trough tracking) in order to further optimize power consumption and dissipation.

In some embodiments, by producing balanced tip and ring signals using driver circuits 360 and 362 on tip line 308 and ring line 310 and by producing balanced tip and rings signals that are 90 degrees out of phase using driver circuits 364 and 366 on tip line 320 and ring line 322, the average power requirement substantially matches the peak power requirement of a single channel, though two channels may be supported simultaneously.

In some embodiments, the DSP 334 may communicate with the drive control circuits 358 to control driver circuits 360, 362, 364, and 366 to provide a first sinusoidal signal pair on tip and ring lines 308 and 310 and to provide a second sinusoidal signal pair that is 90 degrees out of phase with the first sinusoidal signal pair on tip and ring lines 320 and 322.

In some embodiments, just prior to the commencement of ringing, the DSP 334 may communicate with the PWM controller to select a battery supply voltage, which may be sufficient to sustain the on-hook voltage plus audio overheads. When the ringing signal commences, the battery voltage VBAT may track the troughs formed by the tip voltage and the ring voltage, while providing the necessary ringing overheads. The signal overheads (from ground and the battery supply) may be programmatically determined by the DSP 334.

In some embodiments, the differential signal is twice the amplitude of the two individual longitudinal ringing signals. In the balanced ringing scheme, the ringing signal may be applied to both the tip line 308 and the ring line 310 using ringing (sinusoidal) waveforms that are balanced (180 degrees out of phase with each other and of equal amplitude). The resulting differential ringing signal across the tip line 308 and the ring line 310 is twice the amplitude of each the two balanced ringing waveforms, which exposes the ringing circuitry (the load coupled to the tip and ring lines 308 and 310) to only half the total differential ringing amplitude. Similarly, a second ringing signal may be applied to both the tip line 320 and the ring line 322 using sinusoidal waveforms that are balanced (180 degrees out of phase with each other and of equal amplitude). Further, the second ringing signal tip line 320 and ring line 322 may be ninety degrees out of phase with respect to the first ringing signal tip line 308 and ring line 310.

Figure 4A:
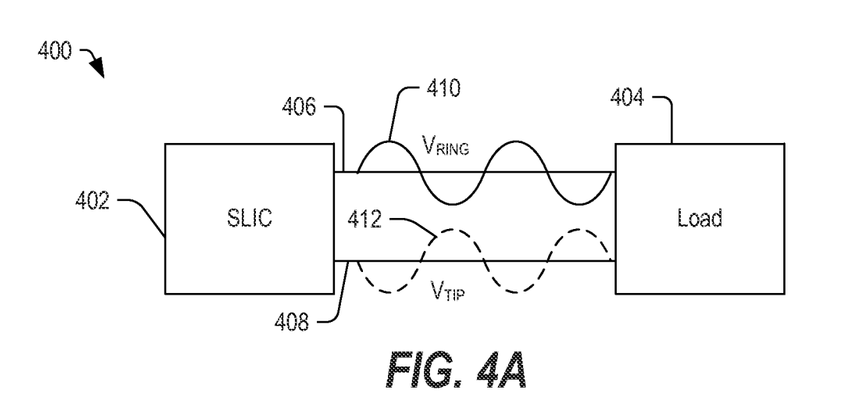
FIG. 4A is a block diagram of a system including a circuit and load illustrating balanced sinusoidal ringing, in accordance with some embodiments of the present disclosure.

FIG. 4A is a block diagram of a system 400 including a circuit 402 and a load 404 illustrating balanced sinusoidal ringing, in accordance with some embodiments of the present disclosure. The circuit 402 may be coupled to the load 404 by a ring line 406 and by a tip line 408. In this example, a balanced differential sinusoidal signal ($V_{RING}$ 410 and $V_{TIP}$ 412) may be applied to the ring line 406 and the tip line 408. The ring voltage ($V_{RING}$) signal and the tip voltage ($V_{TIP}$) signal are 180 degrees out of phase with each other and of equal amplitude.

Figure 4B:
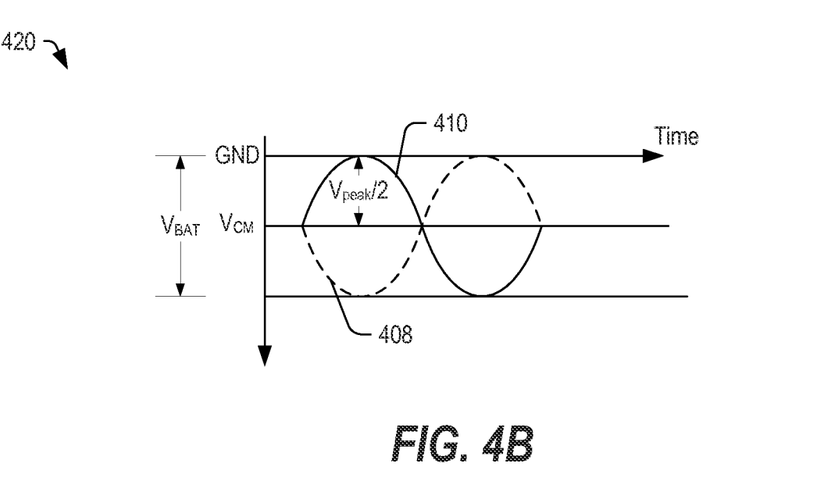
FIG. 4B is a signal diagram of voltage over time for the balanced sinusoidal signals of FIG. 4A.

FIG. 4B is a signal diagram 420 of voltage over time for the balanced sinusoidal signals of FIG. 4A. As shown, the differential voltage between the ring voltage signal ($V_{RING}$) 410 and the tip voltage signal ($V_{TIP}$) 408 is approximately equal to the peak voltage ($V_{peak}$), since each voltage signal is approximately half of the peak voltage.

Figure 5:
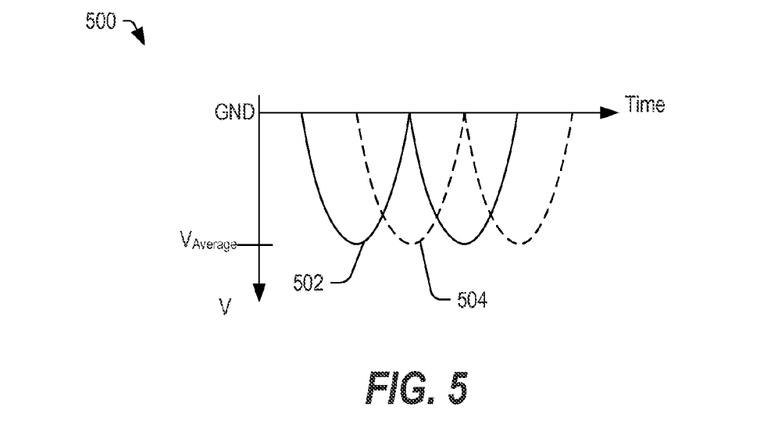
FIG. 5 is a signal diagram of the battery voltage over time for the balanced sinusoidal signals of FIGS. 4A and 4B when combined with a second balanced sinusoidal signal that is out of phase by 90 degrees, in accordance with some embodiments of the present disclosure.

FIG. 5 is a signal diagram 500 of battery voltage over time for the balanced sinusoidal signals of FIGS. 4A and 4B when combined with a second balanced sinusoidal signal that is out of phase by 90 degrees, in accordance with some embodiments of the present disclosure. The signal diagram 500 includes a first differential voltage signal 502 corresponding to a first balanced differential sinusoidal signal pair and includes a second differential voltage signal 504 corresponding to a second balanced differential sinusoidal signal pair that is ninety degrees out of phase with respect to the first signal pair. The average voltage between the two signals and the peak voltages of the two signals is approximately equal.

In some embodiments, by balancing the first sinusoidal signals and the second sinusoidal signals and by controlling the phase of the second sinusoidal signals to be out of phase by 90 degrees relative to the first sinusoidal signals, the driver circuitry may be configured to provide true DC-to-AC conversion such that the peak power becomes equal to the average power. Further, the average power for the two power conversions (DC to first sinusoid and DC to second sinusoid) can be twice the average power of the power conversion of the single channel. Additionally, ringing two channels may have the same input requirement as the peak requirement to ring a single channel.

Figure 6:
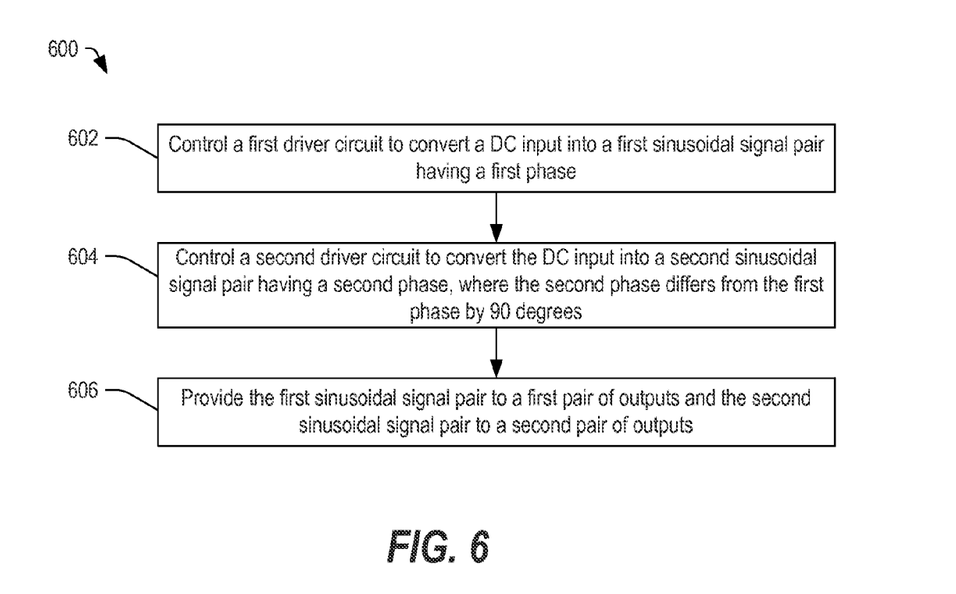
FIG. 6 is a flow diagram of a method of providing DC-to-AC power conversion, in accordance with some embodiments of the present disclosure.

FIG. 6 is a flow diagram of a method 600 of providing DC-to-AC power conversion, in accordance with some embodiments of the present disclosure. At 602, the method 600 may include controlling a first driver circuit to convert a DC input into a first sinusoidal signal pair having a first phase. In some embodiments, the first sinusoidal signal pair may be a balanced signal pair, such that each signal of the pair has the same amplitude and the signals of the pair are 180 degrees out of phase with one another. In some embodiments, the DC input may be a battery voltage or another DC input signal.

At 604, the method 600 may include controlling a second driver circuit to convert the DC input into a second sinusoidal signal pair having a second phase, where the second phase differs from the first phase by an odd multiple of 90 degrees. In some embodiments, the first sinusoidal signal pair may be a sine signal waveform, and the second sinusoidal pair may be a cosine signal waveform.

At 606, the method 600 may include providing the first sinusoidal signal pair to a first pair of outputs and providing the second sinusoidal signal pair to a second pair of outputs. In some embodiments, the first sinusoidal signal pair may be provided to a first tip line and a first ring line, and the second sinusoidal signal pair may be provided to a second tip line and second ring line. In such an embodiment, the signal pairs may provide tip/ring functionality for two channels substantially simultaneously. In some embodiments, the DC-to-AC conversion function may be provided for use in other types of circuits. For example, the DC-to-AC conversion can be used with solar panels to double the output power without increasing the solar panel count. Further, the conversion can also be changed to be from AC-to-DC, making it possible to produce a DC output signal that is stable relative to differential AC signals.

In conjunction with the circuits, systems and methods described above with respect to FIGS. 1-6, a power converter is described that includes a first power converter coupled between a DC node and a first pair of output nodes and a second power converter coupled between the DC node and a second pair of output nodes. The first power converter may be configured to provide a first power signal having a first phase to the first pair of output nodes. The second power converter may be configured to provide a second power signal having a second phase to the second pair of output nodes. The second phase and the first phase may differ by an odd multiple of ninety degrees.

Although the present invention has been described with reference to preferred embodiments, workers skilled in the art will recognize that changes may be made in form and detail without departing from the scope of the invention.

What is claimed is:

1. A power converter circuit comprises:
    a first power converter coupled between a direct-current (DC) node and a first pair of output nodes, the first power converter configured to convert a DC signal at the DC node into a first power signal and to provide the first power signal having a first phase to the first pair of output nodes; and
    a second power converter coupled between the DC node and a second pair of output nodes, the second power converter configured to convert the DC signal at the DC node into a second power signal and to provide the second power signal having a second phase to the second pair of output nodes, the second phase and the first phase differ by an odd multiple of ninety degrees.

2. The power converter circuit of claim 1, further comprising a control circuit configured to control the first power converter to provide the first power signal to the first pair of output nodes and to control the second power converter to provide the second power signal to the second pair of output nodes.

3. The power converter circuit of claim 1, wherein the first power signal and the second power signal comprise one of balanced power signals and unbalanced power signals.

4. The power converter of claim 1, further comprising a power control circuit configured to control a DC voltage at the DC node.

5. The power converter of claim 1, wherein:
    the first power signal comprises a balanced signal pair of substantially equal amplitude and out of phase with one another by 180 degrees; and
    the second power signal comprises a balanced signal pair of substantially equal amplitude and out of phase with one another by 180 degrees.

6. The power converter of claim 1, wherein the first power signal and the second power signal comprise one of sinusoidal signals and trapezoidal signals.

7. The power converter of claim 1, wherein:
    in a first mode, the first power converter and the second power converter convert a DC signal at the DC node into the first and second power signals; and
    in a second mode, the first power converter and the second power converter convert power signals at the first and second pairs of output nodes into a DC signal at the DC node.

8. A circuit comprising:
    a first driver circuit including an input coupled to a node to receive a direct-current (DC) signal, a first output coupled to a first output node and a second output coupled to a second output node;
    a second driver circuit including an input coupled to the node to receive the DC signal, a first output coupled to a third output node and a second output coupled to a fourth output node; and
    a control circuit configured to control the first driver circuit to convert a DC signal at the DC node into a first power signal and to provide the first power signal having a first phase to the first and second output nodes and to control the second driver circuit convert the DC signal at the DC node into a second power signal and to provide the second power signal having a second phase to the third and fourth output node, the second phase and the first phase differing by an odd multiple of ninety degrees.

9. The circuit of claim 8, wherein the control circuit comprises at least one drive control circuit configured to control the first driver circuit to produce the first power signal having the first phase and to control the second driver circuit to produce the second power signal having the second phase.

10. The circuit of claim 8, wherein the first power signal and the second power signal comprise one of sinusoidal signals and trapezoidal signals.

11. The circuit of claim 8, wherein each of the first and second power signals comprises a balanced signal pair of substantially equal amplitude and out of phase with one another by 180 degrees.

12. The circuit of claim 8, each of the first and second power signals comprises an unbalanced signal pair.

13. The circuit of claim 8, further comprising a power control circuit configured to control an amplitude of the DC signal at the node.

14. The circuit of claim 8, further including an input to receive the DC signal, the input coupled to a power source.

15. The circuit of claim 14, wherein the power source comprises a solar panel.

16. The power converter of claim 8, wherein:
    in a first mode, the first driver circuit and the second driver circuit convert a DC signal at the DC node into the first and second power signals; and
    in a second mode, the first driver circuit and the second driver circuit convert power signals at the first and second pairs of output nodes into a DC signal at the DC node.

* * * * *